Figure 1:
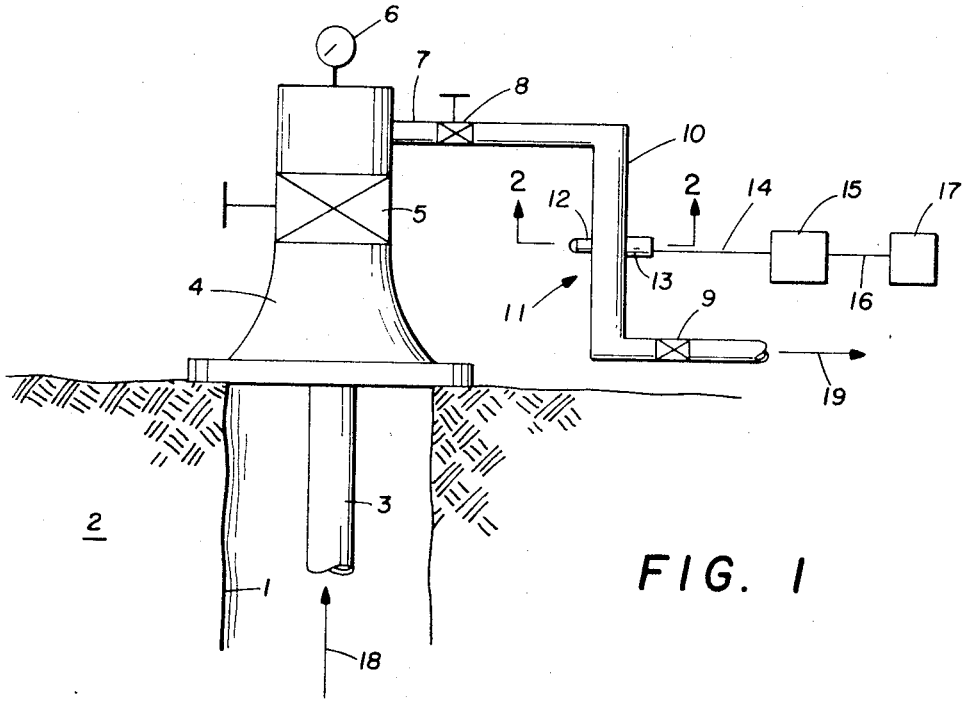
Figure 2:
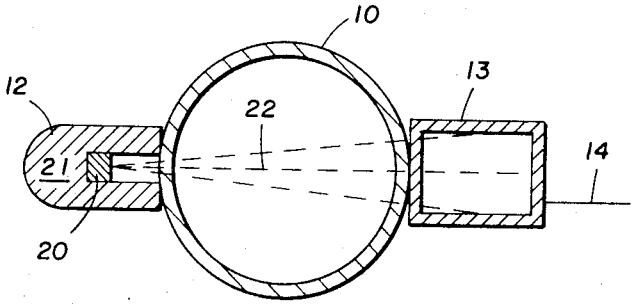
Figure 3:
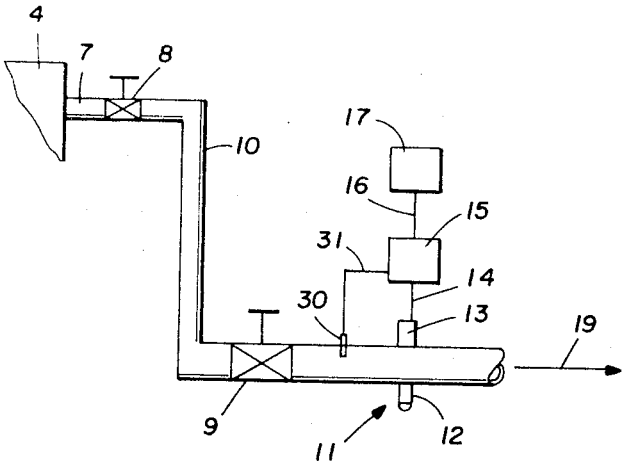

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 14, 1973

913 O.G. 394

T913,010

METHOD AND APPARATUS FOR DETERMINING SOLIDS PRODUCTION FROM A WELL

Thomas Ben Arnold, 4422 Glenwood Lane 75205, Don R. Patterson, 2822 Whitewood Drive 75233, both of Dallas, Tex.

Filed Mar. 15, 1973, Ser. No. 341,475
Int. Cl. G01n *23/12*
U.S. Cl. 250—308
1 Sheet Drawing. 13 Pages Specification

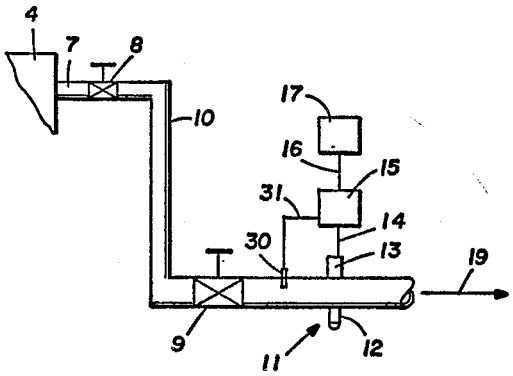

A method and apparatus for determining, qualitatively and quantitatively, when solid particulate matter, such as sand, is being produced from a well along with the normal well fluid. The method and apparatus utilize at least one densitometer which operates on either a nuclear radiation (e.g., neutrons or gamma rays) attenuation mechanism or a vibrating mechanical element mechanism. The densitometer is used in conjunction with the wellhead and its associated production piping. In one embodiment the densitometer is placed on a wellhead production outlet pipe upstream of any choke in said pipe, the densitometer being employed without any temperature compensating device. In another embodiment the densitometer (11) is employed downstream of a choke, and temperature compensating means (30, 15) is employed so that the output of the densitometer is adjusted to a constant temperature value. The densitometer can be set to energize an alarm (17), immediately or after a preset time delay, when the detected specific gravity of the well fluid varies beyond a preset minimum and/or maximum. One or more densitometers can be used on a given production outlet pipe. Densitometers can be employed on part or all of the production outlet pipes of a given wellhead.

Aug. 14, 1973

T. BEN ARNOLD ET AL

METHOD AND APPARATUS FOR DETERMINING SOLIDS PRODUCTION FROM A WELL

Filed March 15, 1973

T913,010